US011889551B2

(12) United States Patent
Fazili et al.

(10) Patent No.: US 11,889,551 B2
(45) Date of Patent: Jan. 30, 2024

(54) TRANSMISSION WITH RESTRICTIONS IN UNLICENSED SPECTRUM

(71) Applicant: InterDigital Patent Holdings, Inc., Wilmington, DE (US)

(72) Inventors: Muhammad Fazili, Audubon, PA (US); Janet A. Stern-Berkowitz, Little Neck, NY (US); Arnab Roy, Phoenixville, PA (US); Kevin T. Wanuga, Souderton, PA (US); Moon-il Lee, Melville, NY (US); Mihaela C. Beluri, Jericho, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 399 days.

(21) Appl. No.: 17/351,913

(22) Filed: Jun. 18, 2021

(65) Prior Publication Data

US 2021/0392681 A1 Dec. 16, 2021

Related U.S. Application Data

(63) Continuation of application No. 16/623,849, filed as application No. PCT/US2018/038915 on Jun. 22, 2018, now abandoned.
(Continued)

(51) Int. Cl.
*H04W 74/08* (2009.01)
*H04W 16/14* (2009.01)
*H04W 74/00* (2009.01)

(52) U.S. Cl.
CPC ....... *H04W 74/0808* (2013.01); *H04W 16/14* (2013.01); *H04W 74/006* (2013.01)

(58) Field of Classification Search
CPC . H04W 16/14; H04W 74/002; H04W 74/006; H04W 74/0808
See application file for complete search history.

(56) References Cited

U.S. PATENT DOCUMENTS

| 9,883,404 B2 * | 1/2018 | Malladi .................. H04L 5/001 |
| 2011/0170499 A1 | 7/2011 | Nazar et al. |

(Continued)

FOREIGN PATENT DOCUMENTS

| CA | 2760505 A1 | 11/2010 |
| CN | 101677465 A | 3/2010 |

(Continued)

OTHER PUBLICATIONS

Ericsson, "Multiple starting and ending positions for LAA UL," 3GPP TSG RAN WG1 Meeting #89, R1-1708962, Hangzhou, P.R. China (May 15-19, 2017).
(Continued)

*Primary Examiner* — Kashif Siddiqui
(74) *Attorney, Agent, or Firm* — Flaster Greenberg, P.C.

(57) ABSTRACT

Systems, devices, and methods for operating in an unlicensed band are disclosed herein. In one example, a device may receive configuration information that includes a maximum channel occupancy time (MCOT) and a plurality of parameters including a plurality of transmission opportunity windows (TOWs). Based on the configuration information, the device may split a transmission into a plurality of bursts that may be grouped into sets of bursts based on how many bursts fit within a TOW. The number of bursts in a set of bursts may be less than or equal to the MCOT. The device may perform a clear channel assessment (CCA) to determine if the channel is busy and to determine a start time within the TOW for the bursts. The device may then transmit the set of bursts for that TOW, where each burst may have a burst indicator (BI).

20 Claims, 11 Drawing Sheets

Related U.S. Application Data

(60) Provisional application No. 62/524,229, filed on Jun. 23, 2017.

(56) References Cited

U.S. PATENT DOCUMENTS

| | | |
|---|---|---|
| 2012/0320872 A1 | 12/2012 | Yang et al. |
| 2015/0110043 A1 | 4/2015 | Fan et al. |
| 2015/0110066 A1 | 4/2015 | Gaal et al. |
| 2016/0066343 A1 | 3/2016 | Lin et al. |
| 2016/0330003 A1 | 11/2016 | Chung et al. |
| 2016/0345344 A1 | 11/2016 | Larsson et al. |
| 2017/0034831 A1* | 2/2017 | Yerramalli ........ H04W 74/0808 |
| 2017/0099664 A1 | 4/2017 | Lunttila et al. |
| 2017/0099667 A1 | 4/2017 | Dinan |
| 2017/0231011 A1 | 8/2017 | Park et al. |
| 2018/0175975 A1 | 6/2018 | Um et al. |
| 2018/0227936 A1 | 8/2018 | Yerramalli et al. |
| 2018/0317244 A1 | 11/2018 | Um et al. |
| 2019/0037600 A1 | 1/2019 | Urabayashi |
| 2019/0075581 A1 | 3/2019 | Salem et al. |
| 2019/0090230 A1 | 3/2019 | Mukherjee |
| 2019/0098658 A1 | 3/2019 | Noh et al. |
| 2019/0159243 A1 | 5/2019 | Tao et al. |
| 2019/0289621 A1 | 9/2019 | Li et al. |
| 2019/0342915 A1 | 11/2019 | Kim et al. |
| 2019/0349998 A1* | 11/2019 | Bhattad ................. H04L 5/0094 |
| 2020/0028605 A1 | 1/2020 | Uzawa et al. |
| 2020/0067676 A1* | 2/2020 | Yi ..................... H04W 72/0446 |
| 2020/0068616 A1* | 2/2020 | Qian .................. H04W 74/002 |
| 2020/0170032 A1 | 5/2020 | Li et al. |
| 2021/0105819 A1* | 4/2021 | Takeda .............. H04W 74/0833 |

FOREIGN PATENT DOCUMENTS

| | | |
|---|---|---|
| CN | 102754381 A | 10/2012 |
| CN | 104348606 A | 2/2015 |
| CN | 104756569 A | 7/2015 |
| CN | 105636233 A | 6/2016 |
| CN | 105814964 A | 7/2016 |
| CN | 105874740 A | 8/2016 |
| CN | 106162909 A | 11/2016 |
| CN | 106301734 A | 1/2017 |
| CN | 106385711 A | 2/2017 |
| EP | 2398180 A1 | 12/2011 |
| JP | 07-322351 | 12/1995 |
| JP | 2007322351 A | 12/2007 |
| WO | 2012019398 A1 | 2/2012 |
| WO | WO 2014/169739 A1 | 10/2014 |
| WO | 2016/185444 | 11/2016 |
| WO | 2016184307 A1 | 11/2016 |
| WO | 2016185444 A1 | 11/2016 |
| WO | 2017000691 A1 | 1/2017 |

OTHER PUBLICATIONS

Third Generation Partnership Project, "Technical Specification Group Radio Access Network; Evolved Universal Terrestrial Radio Access (E-UTRA); Physical channels and modulation (Release 14)," 3GPP TS 36.211 V14.2.0 (Mar. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.6.0 (Mar. 2018).
Third Generation Partnership Project, "Technical Specification Group Radio Access Network; Evolved Universal Terrestrial Radio Access (E-UTRA); Physical channels and modulation (Release 15)," 3GPP TS 36.211 V15.1.0 (Mar. 2018).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.0.0 (Sep. 2016).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.2.0 (Mar. 2017).
Third Generation Partnership Project, "Technical Specification Group Radio Access Network; Evolved Universal Terrestrial Radio Access (E-UTRA); Multiplexing and channel coding (Release 14)," 3GPP TS 36.212 V14.5.1 (Jan. 2018).
Third Generation Partnership Project, "Technical Specification Group Radio Access Network; Evolved Universal Terrestrial Radio Access (E-UTRA); Multiplexing and channel coding (Release 15)," 3GPP TS 36.212 V15.1.0 (Mar. 2018).
Third Generation Partnership Project, "Technical Specification Group Radio Access Network; Evolved Universal Terrestrial Radio Access (E-UTRA); Physical layer procedures (Release 14)," 3GPP TS 36.213 V14.2.0 (Mar. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.6.0 (Mar. 2018).
Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.1 (Jun. 2018).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.2.2 (Apr. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.6.2 (Apr. 2018).
Third Generation Partnership Project, "Technical Specification Group Radio Access Network; NR; Physical layer procedures for data (Release 15)," 3GPP TS 38.214 V15.1.0 (Mar. 2018).
Third Generation Partnership Project, "Technical Specification Group Radio Access Network; NR; Radio Resource Control (RRC); Protocol specification (Release 15)," 3GPP TS 38.331 V0.0.4 (Jun. 2017).
Third Generation Partnership Project, "Technical Specification Group Radio Access Network; NR; Radio Resource Control (RRC) protocol specification (Release 15)," 3GPP TS 38.331 V15.2.1 (Jun. 2018).
R1-1710782, "Discussion on subband-based PUCCH resource allocation and indication", 3GPP TSG RAN WG1 NR Ad-Hoc#2, 5.1.3.2.4, CMCC, Qingdao, P.R. China, Jun. 27-30, 2017, 7 pages.
R1-2103604, "Summary on Rel-17 TEI related discussion", 3GPP TSG RAN WG1 #104bis-e, 8.16, Moderator (NTT Docomo, Inc.), e-Meeting, Apr. 12-20, 2021, 34 pages.
Si-Jia, Liu, et al., "Study on coexistence schemes of LTE-U and WiFi on unlicensed bands", Journal of Chongqing University of Posts and Telecommunications Natural Science Edition, Apr. 15, 2017, pp. 182-189.
3rd Generation Partnership Project, "UE Procedure for Group Common PDCCH for NR", R1-1708975, 3GPP TSG RAN WG1 Meeting #89 Hangzhou, P. R. China Wilus Inc. 7.1.3.1.5 Discussion/Decision, May 15-19, 2017, 5 pages.

* cited by examiner

TRANSMISSION WITH RESTRICTIONS IN UNLICENSED SPECTRUM

CROSS REFERENCE TO RELATED APPLICATIONS

This application is the continuation application of U.S. application Ser. No. 16/623,849 filed Dec. 18, 2019, which is the National Stage, under 35 U.S.C. § 371, of International Application No. PCT/US2018/038915 filed Jun. 22, 2018, which claims the benefit of U.S. provisional application No. 62/524,229 filed on Jun. 23, 2017, the contents of which is hereby incorporated by reference herein.

BACKGROUND

Cellular communication has seen a tremendous rise in demand as more devices are capable of wireless communication and smartphones become increasingly popular. Cellular communication may be used to serve various markets, such as consumer phones, internet of things, and low latency market segments to name a few. A regulating agency may issue licenses for cellular communication spectrum usage; however, there may be occasions where cellular communication may occur in unlicensed spectrum. Operation in unlicensed spectrum may need to contend with sharing spectrum with multiple devices without a central controller by employing channel sensing schemes.

SUMMARY

Systems, devices, and methods for operating in an unlicensed band are disclosed herein. In one example, a device may receive configuration information that includes a maximum channel occupancy time (MCOT) and a plurality of parameters including a plurality of transmission opportunity windows (TOWs). Based on the configuration information, the device may split a transmission into a plurality of bursts that may be grouped into sets of bursts based on how many bursts fit within a TOW. The number of bursts in a set of bursts may be less than or equal to the MCOT. The device may perform a clear channel assessment (CCA) to determine if the channel is busy and to determine a start time within the TOW for the bursts. The device may then transmit the set of bursts for that TOW, where each burst may have a burst indicator (BI).

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Cellular communications may focus on several communications device market segments such as Enhanced Mobile BroadBand (eMBB), Ultra Reliable Low Latency Communication (URLLC) and Machine Type Communications (MTC). The development of Internet of Things (IoT) applications may address connectivity solutions into sensors, actuators, meters, appliances, cars, and other devices the like. IoT networks may have different design objectives varying from local area coverage to wide area coverage. These networks may be optimized to provide device coverage extension, device complexity reductions, and long device battery life. As discussed herein, the terms apparatus and device are interchangeable.

Figure 1A:
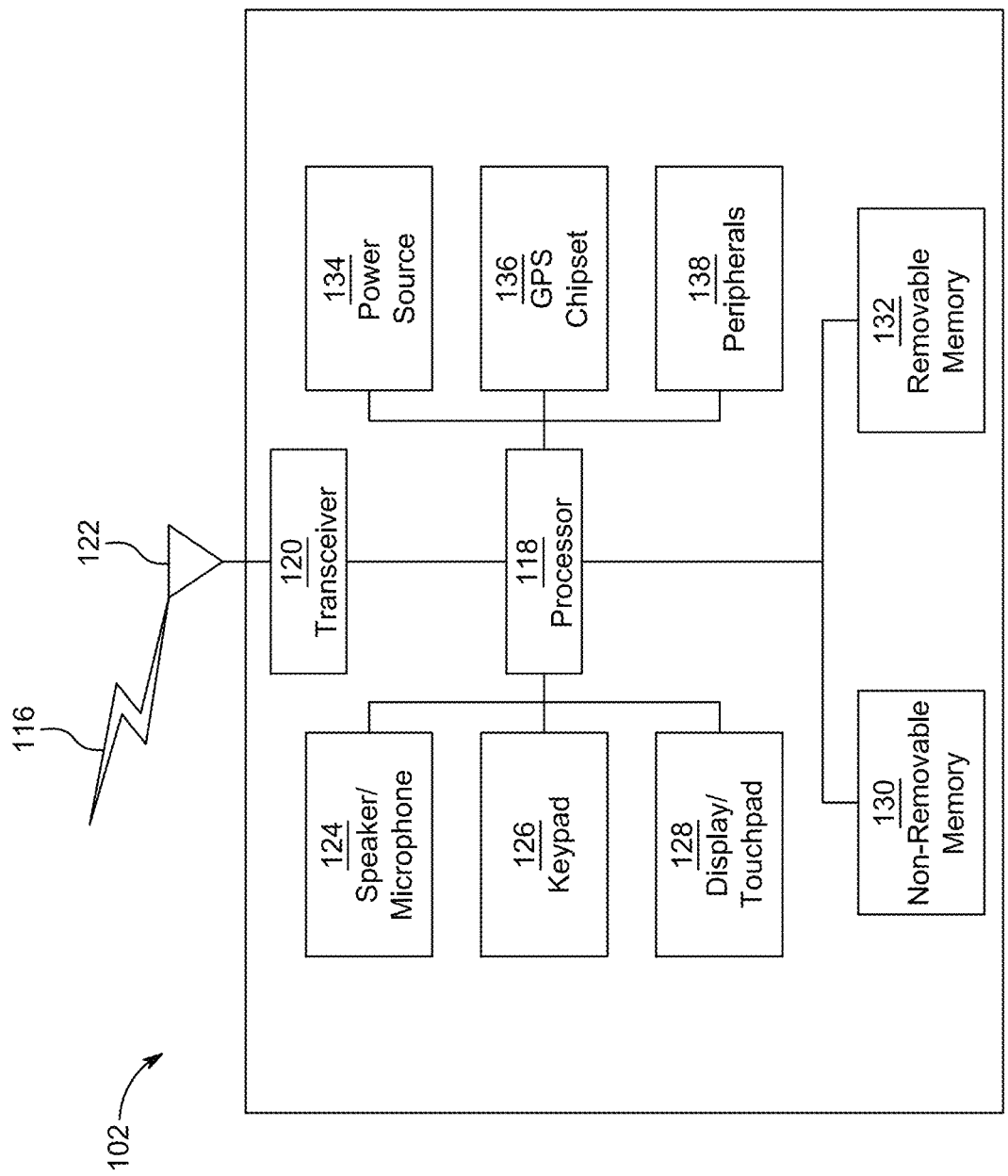
FIG. 1A is a system diagram of an example wireless transmit/receive unit (WTRU) that may be used within a communications system as discussed herein.

FIG. 1A is a device diagram of an example wireless transmit/receive unit (WTRU) 102. The WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the elements described herein while remaining consistent with any disclosed embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1A depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1A as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

WTRUs may operate in cellular communication networks that may be deployed in licensed spectrum. With the increase in demand of cellular applications, however, there may be an increase in traffic load in the licensed spectrum, in which case operators may have to buy more licensed spectrum in order to meet the demand of the increased traffic load. Since license spectrum is expensive, an alternative approach may be to offload cellular traffic to unlicensed bands. Unlicensed spectrum bands may also be used for non-cellular applications such as WiFi, Bluetooth, and other wireless protocol supported applications.

Figure 1B:
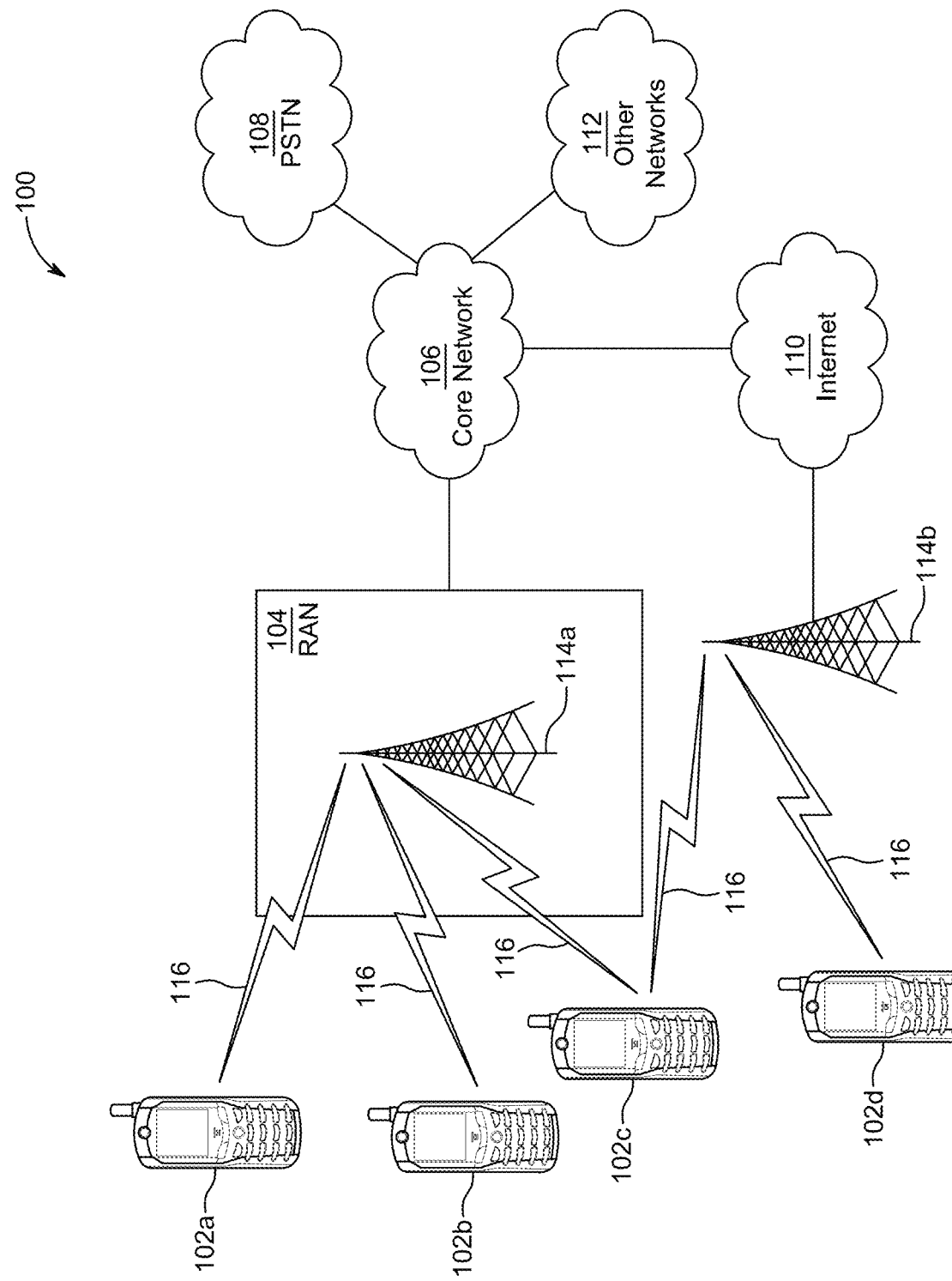
FIG. 1B is a system diagram of an example communications system according to one or more embodiments.

FIG. 1B is a diagram of an example communications system 100 (e.g., cellular communication network) in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

The term channel may be used herein to represent a data channel, a control channel, and/or another channel or signal that may be transmitted and/or received. A data channel may, for example, be a physical DL shared channel (PDSCH), a narrow band (NB)-PDSCH, a new radio (NR)-PDSCH, a physical UL data channel (PUSCH), a NB-PUSCH, a NR-PUSCH, among others. A control channel may, for example be a physical DL control channel (PDCCH), and enhanced (E)-PDCCH, a NB-PDCCH, a NR-PDCCH, a physical UL control channel (PUCCH), a NB-PUCCH, a NR-PUCCH, among others. A channel may, for example be a random access channel such as a physical random access channel (PRACH) or a broadcast channel such as a physical broadcast channel (PBCH). The term channel may be used herein to represent a frequency or operating channel that may be used for transmission and/or reception. A channel may be free or busy, but should be free before transmission on the channel. A common channel may be a control channel such as a DL control channel, a paging channel, a broadcast channel, a shared channel that may carry common information such as a random access response (RAR), a paging channel or message, and/or system information, among others.

As shown in FIG. 1B, the communications system 100 may include a number of interactive elements, such as wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B (eNB), a Home Node B, a Home eNode B, a site controller, an access point (AP), a wireless router, gNB, TRP, STA, cell, and the like, and may be used interchangeably herein. While the base stations 114a, 114b are each depicted as a single element, it will be appreciated that the base stations 114a, 114b may include/represent any number of interconnected base stations and/or network elements. Similarly, as discussed herein, reference to an eNB may be used to represent one or more of a gNB, TRP, STA, cell, base station, and/or the like. The individual elements that constitute nodes on a network may be considered to be devices, such as a base station or WTRU.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1B may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1B, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1B, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities (i.e., the WTRUs 102a, 102b, 102c, 102d may include multiple transceivers for communicating with different wireless networks over different wireless links). For example, the WTRU 102c shown in FIG. 1B may be configured to communicate with the base station 114a, which may employ a cellular-based radio technology, and with the base station 114b, which may employ an IEEE 802 radio technology.

Figure 1C:
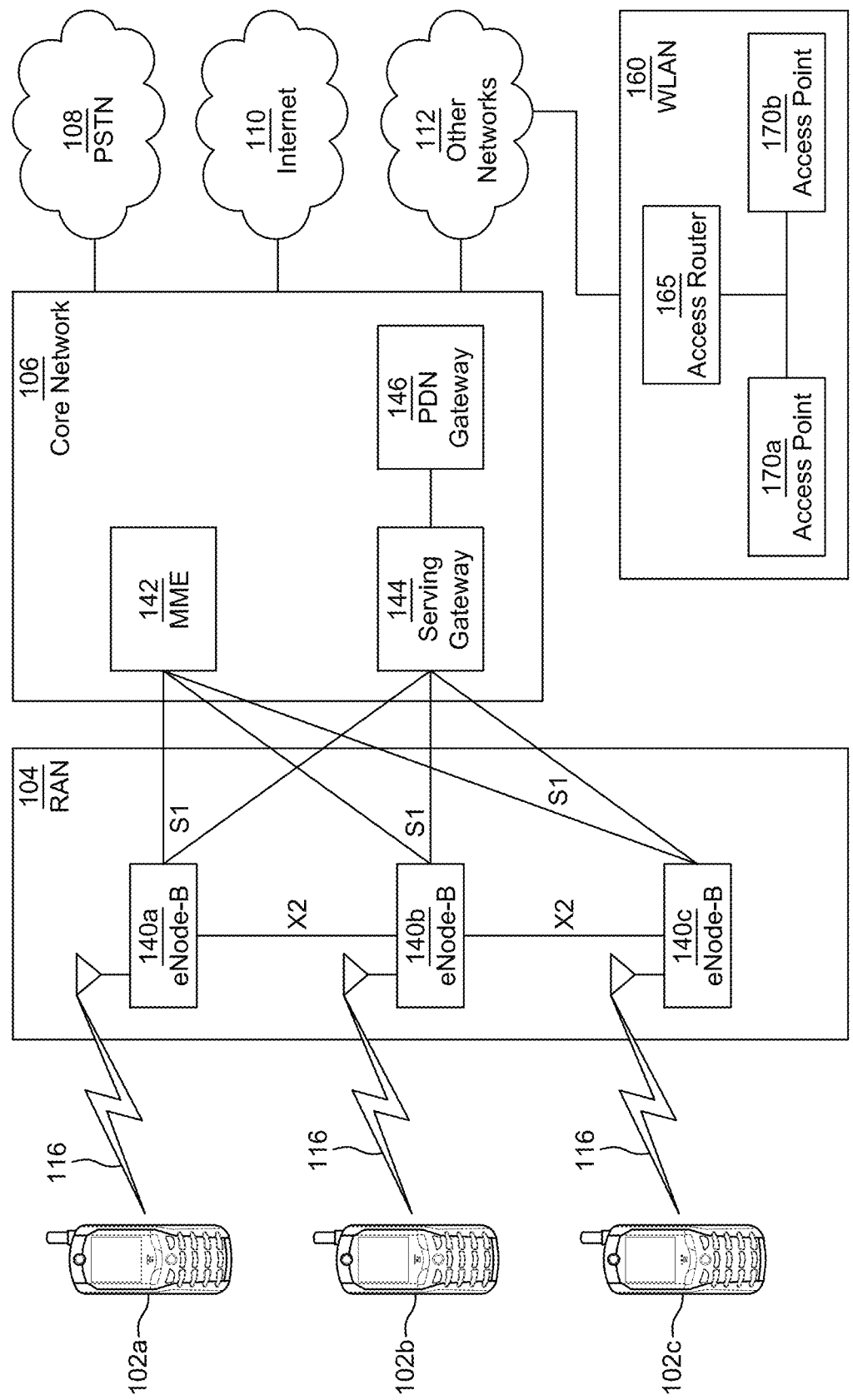
FIG. 1C is a system diagram of an example radio access network and an example core network that may be used within a communications system, such as that illustrated in FIG. 1B.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

In either of the systems shown in FIGS. 1B and 1C, an operator may choose to use both licensed and unlicensed spectrum for the reasons discussed herein. There may be constraints that are imposed on using unlicensed spectrum bands such as sharing the spectrum with multiple WTRUs without a central controller by employing channel sensing schemes. Operation or use of a cell, transmission-reception point (TRP), or carrier in an unlicensed band may be stand-alone or assisted by operation or use of a cell, TRP, or carrier in a licensed band. Such an assisted deployment scenario may be referred to herein as licensed assisted access (LAA). For LAA, the licensed cell, TRP, or carrier may be the primary or anchor cell, TRP, or carrier.

When considering a cellular system operation in unlicensed spectrum, coexistence of the cellular system with other unlicensed technologies such as Wi-Fi, as well as other cellular operators, may need to be addressed in order to, for example, attempt to minimize interference and provide for fairness among the users of the spectrum. Mechanisms such as Listen-Before-Talk (LBT) or Clear Channel Assessment (CCA) may be used. With LBT and CCA, a system node such as an Access Point (AP), eNodeB (eNB), gNodeB (gNB), TRP, user equipment (UE), WTRU, and the like, may listen to a channel (e.g., a frequency band with a certain center frequency and bandwidth) to determine if there may be another WTRU using the channel before transmitting on the channel or a portion of the channel. Listening and/or determining the usage of another WTRU may include or be based on measurements that may include energy detection.

LBT, CCA, and LBT/CCA may be used interchangeably herein. A channel may be determined to be busy, occupied, or in use when a measurement (e.g., of energy) is at or above a threshold. A channel may be determined to be idle, free, clear, or unused when a measurement (e.g., of energy) is at or below a threshold.

Clear, free, idle, available, not occupied, and not busy may be used interchangeably. Not clear, not free, not idle, unavailable, occupied, and busy may be used interchangeably. Channel, frequency channel, and operating channel may be used interchangeably. A CCA failure may mean a channel was found to be busy. A CCA pass may mean that a channel was found to be clear.

In an example, a transmitter on a channel, such as a WTRU with a potential UL transmission and/or an eNB with a potential DL transmission, may evaluate and/or monitor (i.e., receive) the channel to measure and/or determine signal presence or interference on the channel prior to transmission in order to determine whether the channel may be in use (e.g., busy and/or occupied) by another, such as another system, WTRU, or signal. The transmitter may, for example, compare the received signal and/or interference from the channel to some criteria, such as one or more threshold levels, and may determine based on the comparison whether the channel may be free as part of a LBT/CCA step. If the transmitter determines the channel is free, the transmitter may transmit on the channel. If the transmitter determines the channel is not free, the transmitter may not transmit on the channel and/or may defer the potential transmission and/or discard the potential transmission. As discussed herein, a transmitter may refer to any transmitting device such as a WTRU, eNB, or the like). Similarly, a receiver may refer to any receiving device, such as a WTRU, eNB, or the like). In one example, a transmitter may be a WTRU (e.g., for UL transmission) and/or an eNB (e.g., for DL transmission). In another example, a receiver may be a WTRU (e.g., for DL reception) and/or an eNB (e.g., for UL reception).

Frame Based Equipment (FBE) may refer to equipment for which transmit/receive timing may be fixed, and/or structured. Load Based Equipment (LBE) may not perform LBT/CCA according to a certain frame structure (e.g., at fixed or defined times). LBE may perform LBT/CCA whenever it has data to transmit. As discussed herein, FBE may be any node or device such as a WTRU, UE, eNB, gNB, TRP, STA, or AP, that may transmit and/or receive on a licensed or unlicensed channel.

For channel evaluation, before performing a transmission or a burst of transmissions on an operating channel, equipment may perform a LBT/CCA check that detects energy on the channel as discussed herein. An LBT/CCA time period for channel evaluation may be a fixed or minimum amount of time. Channel Occupancy Time (COT) may be the total time during which the transmitter may transmit on the given channel without re-evaluating the availability of that channel. A maximum COT (MCOT) value may be configured by the system, and/or as dictated by the relevant wireless standard or regulation. The MCOT for some transmitter may be set by the manufacturer of the device but may be less than a MCOT value of the system. Example values for MCOT may be 4*ms* or 10 ms.

Idle Period may be the time (e.g., a consecutive period of time) during which the equipment may not transmit on a channel. The Idle Period may have a minimum requirement with respect to the COT, such as 5% of the COT that may be used by a device, for example for the current Fixed Frame Period.

If a transmitter determines that during or as a result of LBT/CCA an operating channel or channels is clear, it may transmit on the clear channel or channels (e.g., immediately). If the transmitter determines during or as a result of LBT/CCA an operating channel is occupied, it may not transmit in that channel until it performs a subsequent LBT/CCA that determines the channel to be clear. If the transmitter determines that during or as a result of LBT/CCA an operating channel is occupied, it may not transmit on that channel during the next Fixed Frame Period. An LBT/CCA may be performed subsequent to determining a channel was not clear and may involve a wait or back-off time before checking for a clear channel.

In some scenarios, such as for 3GPP LAA, a WTRU may perform CCA to determine whether a channel is free. If the WTRU determines that the channel is not free, the WTRU may then add a back-off or wait time, such as an additional contention window amount of time. Once the WTRU determines the channel is free, the WTRU may check again before actually transmitting (i.e., where the actual transmission may not begin right after the channel is determined to be free). For example, if the WTRU is not within a check-window (e.g., 25 us) prior to actual transmission, the WTRU may perform CCA for at least a check-window amount of time prior to actual transmission, where the WTRU may only transmit if the channel is determined to be free for at least part of the check-window amount of time.

Any reference to a CCA may be a full CCA or a short CCA. A full CCA may include adding one or more back-off times when a channel is determined to be busy. A short CCA may be a quick check (e.g., energy detection check) in a check-window prior to the start of transmission or intended/planned transmission. For example, when a WTRU performs CCA for a first subframe (SF) or symbol, the WTRU may perform a full CCA to determine whether the channel is free. The WTRU may perform a short CCA prior to the actual transmission to re-check that the channel is still free, for example if there is a gap between the end of the full CCA and the start of the actual transmission.

In some scenarios, such as LTE LAA UL, a WTRU may perform CCA for a transmission beginning on the starting boundary of a time period or beginning on a boundary of a time unit that may be within a time period.

A subframe is used herein as a non-limiting example of a time period, time unit, and/or time resource. Other examples of a time period include a set of subframes, a frame, a set of frames, a slot, a mini-slot, a set of slots or mini-slots, a TTI, a short TTI, a multi-symbol TTI, symbol, a set of TTIs, a set of symbols, a sync burst, a sync block, a set of sync bursts or sync blocks, and the like. A symbol is used herein as a non-limiting example of a time unit that may be within a time period. A time period may comprise one or more time units. Other examples of a time unit may include a slot, a mini-slot, a TTI, a short TTI, a multi-symbol TTI, a set of symbols, a sync burst, a sync block, and the like. In some instances, time unit, and time period may be used interchangeably. In some instances, a time unit may be a subframe. In some instances, a time resource may be, or may be used to represent, one or more time periods and/or one or more time units.

In an example, a WTRU may perform a full CCA for a transmission beginning on a subframe boundary or for a transmission beginning on an indicated symbol boundary within a subframe. The WTRU may receive a grant for one subframe (e.g., a full or partial subframe) or for a set of consecutive subframes. The WTRU may perform a short CCA before transmitting on a granted subframe. For a set of granted subframes, if the WTRU determines that the CCA fails (e.g., the channel is busy or not idle), the WTRU may perform a full/short CCA for the next, or later, granted subframe. When the WTRU determines the channel to be free for a subframe in a set of granted subframes, the WTRU may transmit on that subframe and the remaining subframes in the granted set. Transmission may be performed without performing a CCA for the subsequent subframes, for example when a transmission is continuous. If there is a break in the transmission, the WTRU may perform another short CCA for transmission on a subframe in the set after the break.

In an embodiment channel sharing may be implemented using time durations (e.g., windows or gaps) where a device (e.g., WTRU) may not use a channel. The time durations for when a channel may be used and/or not used may be preconfigured. A coexistence gap may be used to represent a time duration when a channel may not be used, for example based on a configuration.

A device may not use a channel for transmission and/or reception during a coexistence gap. The device may consider the channel as busy or unavailable during a coexistence gap. The device may consider the channel to be free, usable, or available at a time other than the time of a coexistence gap, for example when one or more coexistence gaps are configured (e.g., determined based on a configuration) and/or when a CCA is not used to determine channel availability.

In an embodiment, a WTRU may employ coverage enhancement (CE) techniques. For instance, a WTRU may use repetition to improve the performance or coverage of a transmission or reception. Repetitions of a transmission may be combined (e.g., soft combined) at a receiver to improve the performance or coverage of a transmission or reception. In a CE example, a transmitter may repeat a transmission X times (i.e., X time periods or time units) and a receiver may combine up to X of the transmissions in order to successfully receive the transmission, where a successful reception may be determined based on a CRC check. There may be one or more CE levels supported in a cell and/or by an eNB. A WTRU may determine and/or operate using a CE level. A CE level may use, may correspond to, and/or may be configured with a number of repetitions. The number of repetitions that may be used for a CE level may be different for different WTRUs and/or different purposes (e.g., different signals or channels). A WTRU may transmit and/or receive according to a CE level and/or a number of repetitions that may be configured (e.g., configured for a CE level). A higher CE level (e.g., a CE level with more CE) may use more repetitions.

In some scenarios, devices (e.g., WTRUs) may operate or may be limited to operate within in a bandwidth (BW) that may be less than the operating BW (e.g., system bandwidth, a carrier bandwidth in a system) of a cell or node where the cell or node may be at least one of: a) a cell or node on which the WTRU is camped; b) a cell or node where the WTRU is connected or communicating; and/or c) a cell or node that is a serving cell or node of the WTRU. Such a WTRU may be considered a bandwidth (BW) limited or narrowband (NB) WTRU. The bandwidth limited or NB WTRU may have a limited capability of transmitting and/or receiving signal in a limited bandwidth or a narrowband at a time. BW limited and NB may be used interchangeably herein.

The BW limitation of a WTRU may be an RF BW limitation. The BW limitation of a WTRU may be a value such as 200 kHz or 1 Physical Resource Block (PRB), 1.4 MHz or 6 PRB, or 3 MHz or 15 PRBs.

A BW limited or NB WTRU that may be limited to operation in a NB such as 1 or 6 PRBs may be limited per time duration, time period, or time unit. For example a BW limited WTRU may transmit and/or receive in one NB at or during a first time unit or time period and another NB at or during a second time unit or time period. There may or may need to be a gap in time between the first and second time units or time periods, for example to enable the WTRU to tune to the second NB.

A NB WTRU may transmit (or receive) a portion of its transmission (or a transmission from another node) in each of multiple time units or time periods, for example to compensate for its BW limitation. For example, a WTRU that may be limited to one PRB in a time unit or time period may transmit (or receive) a 6 PRB transmission as 1 PRB in each of 6 time units or time periods.

A WTRU that is not BW limited may transmit or receive (e.g., a transmission that may be or may include a signal, a channel, a transport block, etc.) using or over a first time unit (or time period) such as a subframe. A WTRU that is BW limited may transmit or receive using a second time unit (or time period) that may be a multiple of the first time unit.

As discussed previously, the amount of time that a device may occupy (e.g., transmit on) an unlicensed channel may be limited, for example, by an configured value, such as the MCOT. The MCOT may be based on at least one of fairness, a standard, or a regulation.

For some applications, for example narrowband, bandwidth limited, and/or CE applications, a transmission (e.g., of a control channel, data channel, or transport block) may need or use a set of time units and/or time periods to complete the transmission. The set of time units and/or time periods may exceed a limitation such as a MCOT. The transmitter may or may need to release the channel before the transmission is complete. For example a CE transmission may use 100 subframes and MCOT may be 10 ms (e.g., 10 subframes).

Systems, methods, and devices may be needed to enable a transmitter to release a channel at least once during a transmission and later complete the transmission, such that a receiver may be able to receive (e.g., successfully receive) the full transmission. To address this need, one or more of the following may be employed: transmissions may be based on available resources when a channel is free; transmissions in N of M allocated resources for both a single allocation and sets of allocations; transmissions may be split into multiple bursts; and/or an indicator may be included (and used) with each burst to enable the receiver to assemble or combine the bursts. For example, a WTRU may transmit a transmission of at least one channel (e.g., data or control channel) and/or transport block using a set of resources (e.g., in time and/or frequency) when the transmission fits in a remaining subset of the set of resources when the channel (e.g., frequency channel) is determined to be usable or available (e.g., when CCA is determined to pass).

As discussed herein, a transmission may be or may include at least one channel, signal, transport block, codeblock group, or codeblock, wherein a transport block may correspond to one or more codeblocks or codeblock groups. A transmission may be or may include one or more repetitions (e.g., a set of repetitions) of a channel, signal, or transport block that may be combined (e.g., soft combined) to receive and/or decode (e.g., to successfully receive and/or decode) the channel or transport block.

A burst may be or may include at least part of a transmission that may be or may need to be transmitted and/or received, for example in a set of resources. A burst may be or may include at least part of a channel (e.g., a data channel, a control channel, a random access channel, and/or a broadcast channel), a signal, a codeblock, a codeblock group, or a transport block that may be or may need to be transmitted and/or received, for example in a set of resources. A burst may be or may include a set of repetitions or a subset of a set of repetitions of a channel, a signal, a codeblock, a codeblock group, or a transport block that may be transmitted and/or received, for example in a set of resources.

Figure 2A:
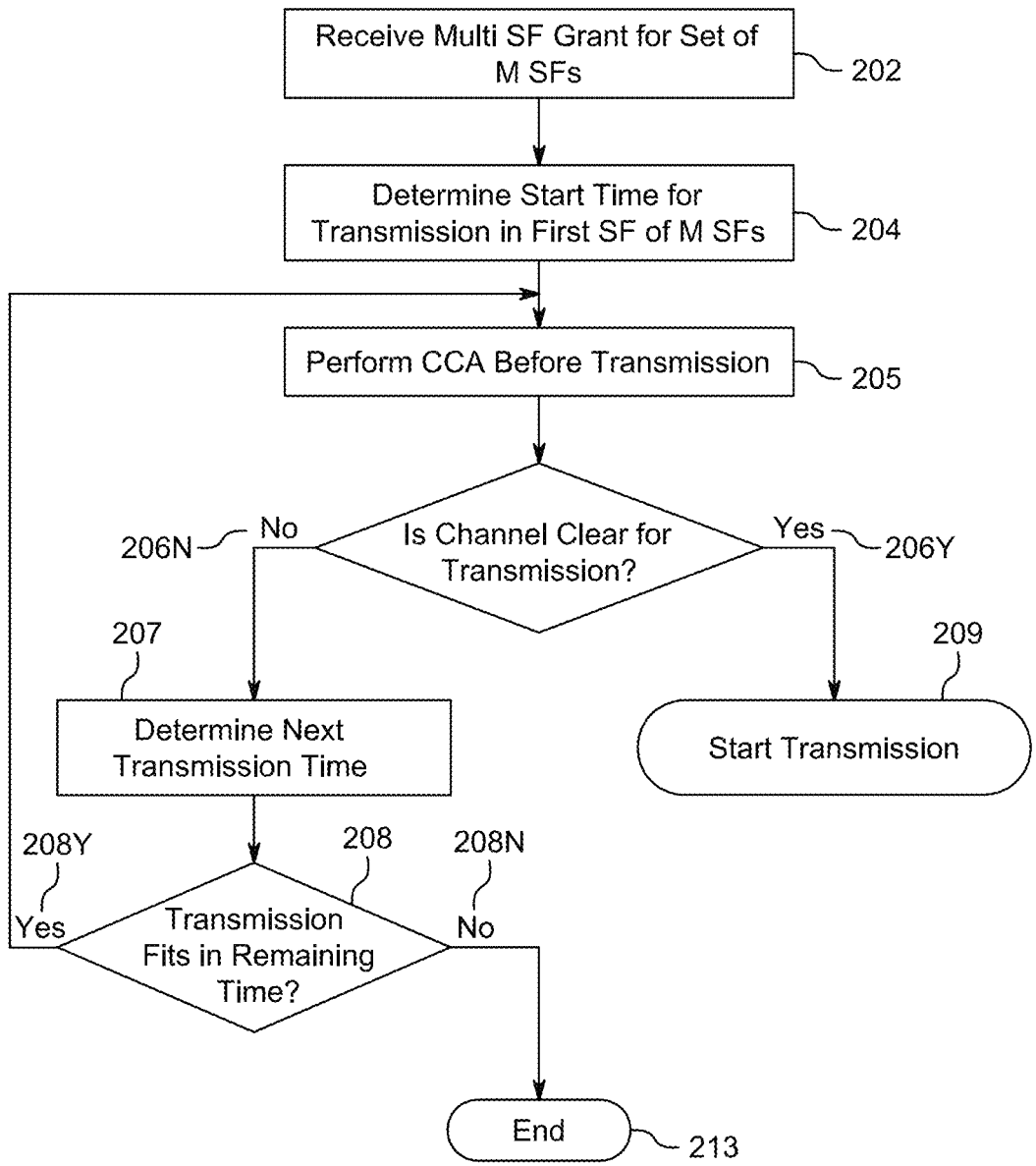
FIG. 2A is an illustration of an example process of a transmission based on available resources according to one or more embodiments disclosed herein.

FIG. 2A illustrates an example process for a transmission based on available/allocated resources. In this example, the transmission may be based on available resources when a channel is free. At 202, a transmitter (e.g., WTRU) may receive a grant, allocation, or configuration for a transmission (e.g., an UL transmission). The grant, allocation or configuration may include a set of transmission parameters and/or a set of resources (e.g., time and/or frequency resources such as subframes or PRBs). For example, a set of M time resources (e.g., M SFs) may be granted, allocated, and/or configured. The M time resources may be contiguous or non-contiguous time resources. The term "allocated" may be used to represent granted and/or configured as discussed herein.

At 204, the transmitter may perform CCA (e.g., full CCA) and determine the start time for a first time resource (e.g., a first subframe), where the first time resource may be the first of the M allocated resources. The start time for a transmission may be configured or indicated with respect to an allocated time resource. The start time may, for example, be the start of the time resource or the start of a time unit such as the $n^{th}$ symbol within the time resource. At 205, the transmitter may perform CCA (e.g., short CCA) for the first resource (e.g., the first of the M subframes) immediately before the time when the transmission starts (i.e., the start time).

At 206Y, if it determined that the channel is clear for transmission in the time resource, the WTRU may begin transmitting in the time resource at 209. At 206N, if the channel is not clear for transmission, the transmitter may not transmit in that time resource. At 207 the transmitter may determine when the next time resource, within the M time resources, a transmission may occur (i.e., checking if the channel is clear by performing CCA) and deferring the transmission to that time.

At 208, the transmitter may determine if the transmission fits within the remaining time resources of the M resource allocation (e.g., beginning with transmission in the next resource). At 208N, if the transmitter determines the transmission does not fit, the transmitter may not use the remainder of the allocation and my end the process at 213. At 208Y, if the transmitter determines the transmission fits, the transmitter may transmit in the next resource, for example after determining the channel to be available based on performing CCA at 205.

Figure 2B:
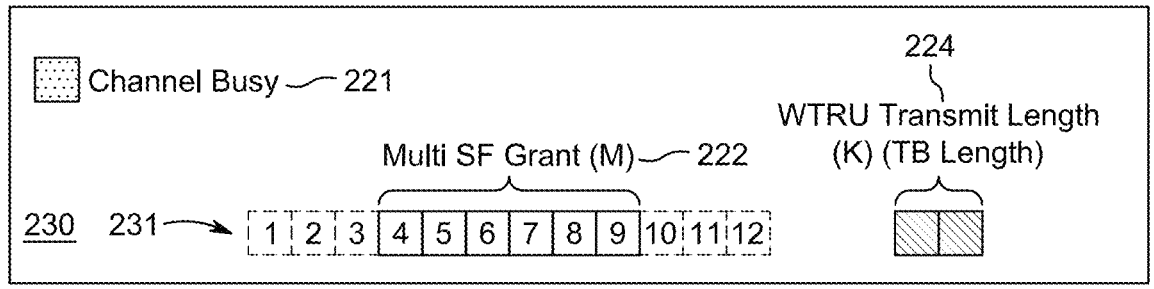
FIG. 2B is a diagram of example transmissions based on available resources according to one or more embodiments disclosed herein.
Figure 2B:
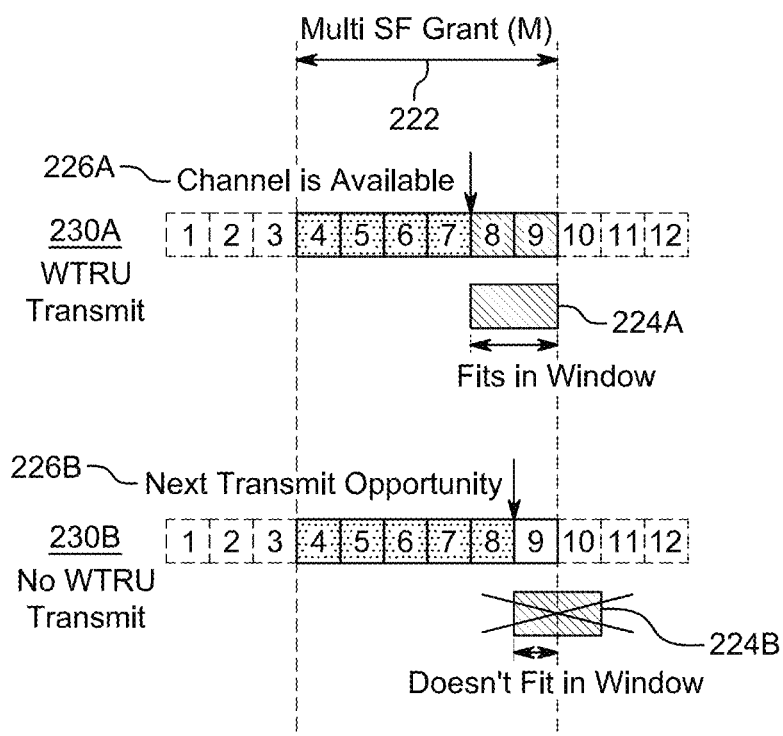

FIG. 2B illustrates a several examples and the example process of FIG. 2A, where there is transmission based on available/allocated resources. As discussed above, the transmitter may receive a grant/allocation of M resources 222 (e.g., six subframes numbered 4-9) and the transmission 230 (e.g., of a channel or transmission block (TB)) may be K resources in length 224 (e.g., two subframes). There may be a total of twelve possible subframes 231 numbered 1-12. The subframes 231 with dotted lines may indicate that they are outside of the grant M 222, and the subframes 231 with solid lines are within the grant M 222.

In one example 230A, the transmitter may determine that the channel is available for transmission at a certain point in time 226A (e.g., start time after subframe 7). The transmitter may then determine that the remaining resources, that is the number of resources remaining between the start time 226A and the end of the grant M 222, in the grant is larger than or equal to the resources that the transmitter may need for the transmission 224A. In this example, assuming a K long transmission (e.g., two subframes), the transmission 224A fits into the remaining time grant 222 as shown by the blocks with diagonal lines (i.e., subframes 8 and 9), and therefore the transmitter will be able to send the transmission 224A.

In one example 230B, the transmitter may perform CCA (e.g., full CCA) and determine that the channel may be available for transmission at a certain point in time at a particular subframe 226B. The transmitter may then determine that the remaining resources (e.g., the number of remaining subframes) in the grant (e.g., one subframe) is smaller than the transmission 224B and the transmitter may not transmit. Specifically, since the next transmission opportunity is at the end of subframe 8 and the transmission 224B requires two subframes, it would not fit within the grant M 222 which only has one subframe remaining between the end of the grant M 222 and the next available transmission 226B. As discussed herein, allocation of M resources may be semi-statically configured (e.g., via semi-persistent scheduling, SPS), or dynamically configured (e.g., via a control channel and/or DCI).

Figure 3A:
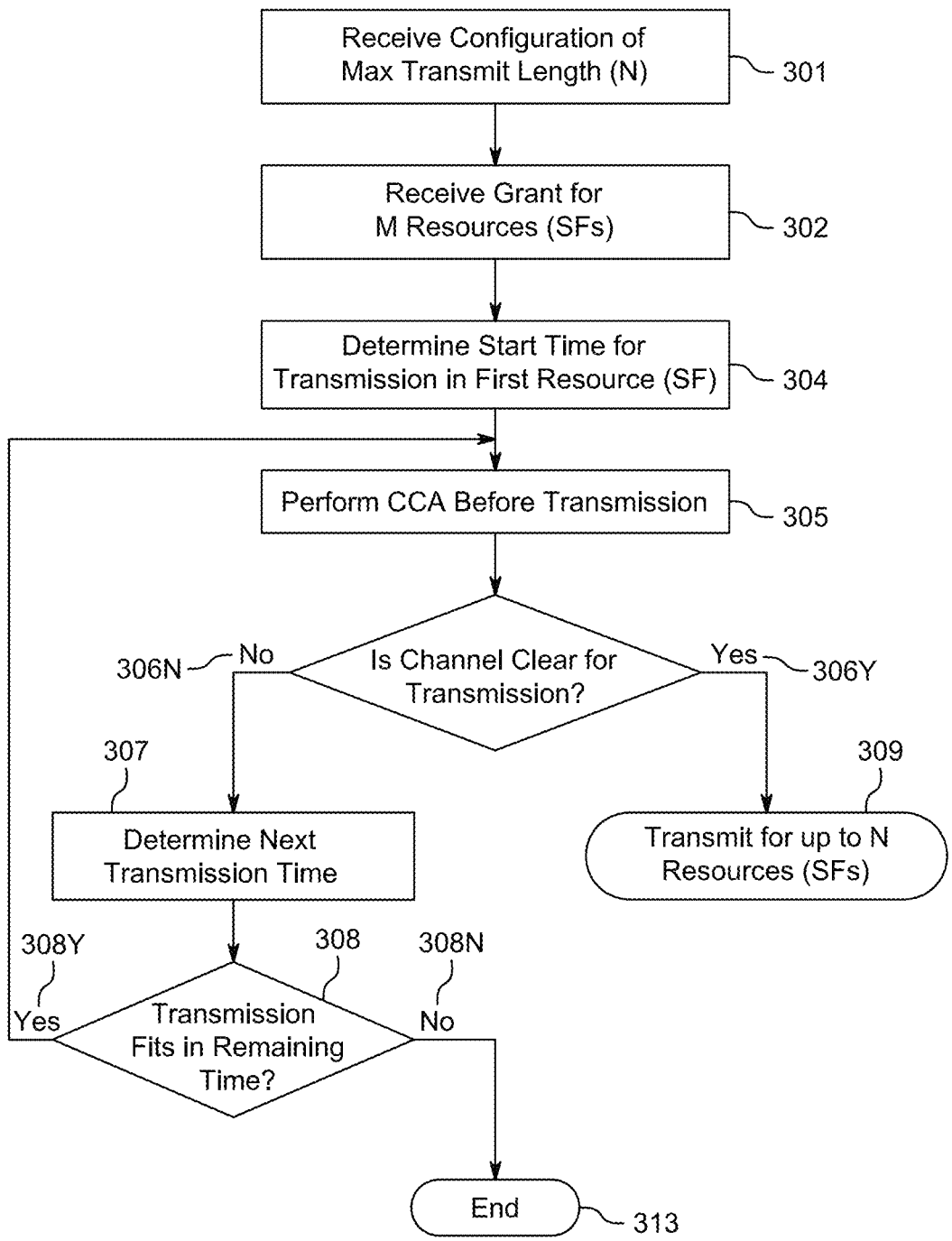
FIG. 3A is an illustration of an example process of a time limited transmission for a set of allocated resources according to one or more embodiments disclosed herein.

FIG. 3A illustrates an example process of a time limited transmission for a set of allocated resources. In some case, a transmission may have one or more limitations, such as when a transmitter receives an allocation for a set of M resources and may only use N (e.g., at most N) of the M resources for transmission, where the actual values of M and N may be preconfigured. The M resources may be contiguous in time and the transmitter may use (e.g., transit in) up to N contiguous resources in time. In some instances, N may be or may correspond to a MCOT.

As discussed herein, M and/or N may be configured semi-statically (e.g., by higher layer signaling) or dynamically (e.g., by a control channel and/or DCI). Also, in some instances, M and/or N may be included in or with an UL grant or a triggering DCI.

In the example process shown in FIG. 3A, at 301 a transmitter (e.g., WTRU) may receive a configuration of a maximum transmission length N, where N may be a number of resources (e.g., consecutive or contiguous resources) that the transmitter may use for transmission. At 302, the transmitter may receive an allocation (e.g., an UL allocation or grant) for a set of M resources (e.g., M subframes). In this example, N may be less than or equal to M, and N may be set to a MCOT to meet a MCOT requirement.

At 304 the transmitter may perform a CCA (e.g., full CCA) determine the start time for a first time-resource (e.g., a first subframe), where the first time resource may be the first of the M granted resources. The start time for a transmission may be configured or indicated with respect to an allocated time resource. The start time may be the start of the time resource or a start of a time unit such as the $n^{th}$ symbol within the time resource.

At 305 the transmitter may perform CCA (e.g., short CCA) immediately before the start of the first transmission time within the set of M resources (e.g., subframes), and in doing so may determine whether the channel is free and available.

If the transmitter determines the channel is available at 306Y, the transmitter may transmit in one or more resources within the allocated M resources at 309. The transmitter may transmit in up to N contiguous resources and the number of contiguous resources that the transmitter may transmit may be determined (e.g., by the transmitter) based on at least one of: M; N; the remaining time resources in the allocation (e.g., when the transmitter determines the channel to be free); the number of resources the transmitter may need or use for its transmission (e.g., of at least one channel or transport block); and/or the amount of data the transmitter must transmit. For example, the transmitter may transmit in up to N of the M resources after determining that there are enough remaining resources for the transmitter's transmission (e.g., of at least one channel or transport block). In some instances, between consecutive (e.g., contiguous) transmissions, the transmitter may not recheck channel availability; also, when there is a break in transmission, the transmitter may recheck channel availability.

If the transmitter determines that the channel is busy at 306N, the transmitter may not transmit at the start of the first transmission time. At 307 the transmitter may determine the next transmission time (e.g., within the allocation) if one exists. The transmitter may determine whether the transmitter's transmission fits in the remaining transmission time (e.g., that begins with the next transmission time). When the transmitter determines that the transmission may not fit in the remaining time 308N, the transmitter may not use the remainder of the allocation 313. When the transmitter determines that the transmission may fit in the remainder of the allocation 308Y, the transmitter may try again at the next transmission time and the transmitter may perform CCA at 305 to determine if the channel may be free for transmission before the start of the next transmission time (e.g., within the allocation).

Figure 3B:
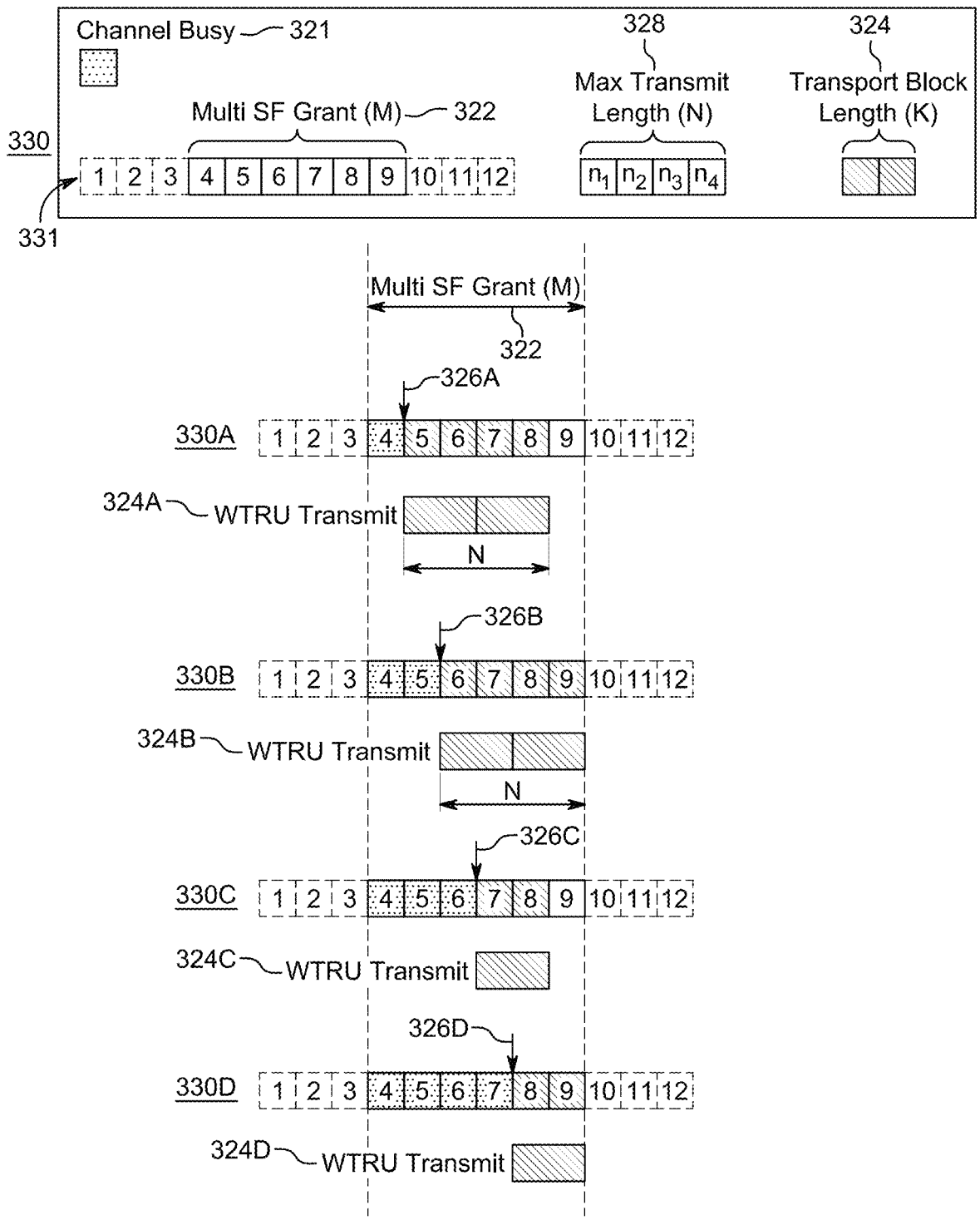
FIG. 3B is a diagram of example time limited transmissions for a set of allocated resources according to one or more embodiments disclosed herein.

FIG. 3B illustrates a visual explanation along with several examples of the process of FIG. 3A, where there is a time limited transmission for a set of allocated resources. At 330, a transmitter may receive an allocation of M resources 322 (e.g., six subframes of a total twelve subframes 331) and the transmitter transmission (e.g., of a channel or transmission block) may use K resources 324 shown by blocks with diagonal lines (e.g., two subframes). The transmitter may receive a configured maximum transmission length of N 328 (e.g., four subframes) resources. When a channel is busy it may be indicated by a box with dots 321. The subframe 331 boxes with dotted lines may indicate that they are outside of the grant M 322, and any subframe boxes 331 outlined with solid lines may be within the grant M 322

In the examples of 330A and 330B, when the transmitter determines the channel may be available for transmission, the remaining resources in the grant M 322 (e.g., the number of subframes) in the allocation (e.g., five subframes for 330A and four subframes for 330B) may be larger than (or equal to) the maximum transmission length, N. Specifically for 330A, based on a CCA the transmitter may determine that the channel is busy at subframe 4, therefore the start time for the transmission may be 326A and the transmission N 324A should fit within the grant M 322. Similarly for 330B, the start transmission time may be determined to be 326B after the channel is not busy, and the transmission of N 324B should fit within the grant M 322. The transmitter may transmit in up to N 328 (e.g., four subframes) resources, but may transmit less in some instances. For example, the transmitter may transmit two transport blocks of length K 324 in four resources (i.e., subframes), so the transmitter may transmit two transport blocks. In another example, N may be three and only one transmission block may fit in three resources, therefore only one transmission block would be transmitted by the transmitter.

When the transmitter has enough data for N resources (e.g., subframes), the transmitter may transmit multiple times (e.g., multiple back-to-back transport blocks).

In the examples of 330C and 330D, when the transmitter determines the channel may be available for transmission, the number of remaining resources in the grant M 322 (e.g., subframes) may be smaller than the configured maximum N 328. The transmitter may determine whether it may transmit once or multiple times (e.g., multiple transport blocks). In both 330C and 330D the number of remaining subframes in the allocation is not large enough to fit two transmissions (e.g. two transport blocks) by the transmitter. Specifically for 330C, the transmitter may determine that the channel is busy up until 326C, at which point the transmission N 324C may only have room for one transport block and subframe 9 may not be used. Similarly for 330D, the transmission may begin at 326D which may only leave room for one transport block for the transmission 324D. In other examples, the transport block length K may be a different length, such as one, in which case for 330D for example, you could fit three transport blocks after the determined start time 326D.

In an embodiment, an allocation of resources (i.e., a set of M resources) may be referred to as a Transmit Opportunity Window (TOW) that may be used by a transmitter (e.g., a WTRU or eNB) to send a transmission to a receiver (e.g., eNB or WTRU). A transmitter (e.g., a WTRU) may complete a transmission in TOW when it transmits at least one channel (e.g., data or control channel) or TB in the remaining resources of an allocation of the TOW, for example when a WTRU determines the channel (e.g., the frequency channel) may be free. The allocation of multiple TOWs may be valid until cancelled, for example like semi-persistent scheduling (SPS), or it may be configured with a duration or a number of TOWs (e.g., W sets).

One or more parameters of one or more set(s) of resource allocations or TOW(s) may be signaled via higher layer signaling (e.g., RRC signaling) and/or via a control channel (e.g., in a DCI). The parameters may be preconfigured, periodic, scheduled, or triggered aperiodically. A device (e.g., eNB) may configure or indicate the parameters to a transmitter, where the parameters may include at least one of: number of time resources (e.g., subframes) per set/TOW (M); maximum transmission length (N) within a set/TOW; number of sets/TOWs (W), or total duration of the multi-set/TOW allocation; timing of the allocation (e.g., frame, subframe, slot, etc. of a set/TOW of the multi-set allocation); time duration/period between consecutive sets/TOWs (e.g. measured in frames, subframes, slots, etc.); periodicity of the sets/TOWs; an offset to a next set/TOW (e.g. in resources or subframes); an indication of a start and/or first set/TOW (e.g. a first resource or subframe); an indication of an end and/or last set of resources/TOW (e.g. a last resource or subframe); a duration (e.g. M in resources or subframes); and/or an indication of how the allocation may be activated and/or deactivated.

A transmitter may provide an indication to another entity (e.g., a WTRU to an eNB or gNB) that the transmitter may no longer need the allocation and/or that the allocation may be released or deactivated. For example, a WTRU may transmit at least one of the following (e.g., in a last transmission) to provide the indication for ending the allocation: a buffer status report indicating zero size; an indication in a control channel (e.g., UL control channel); a reference signal (e.g., a configured reference signal); a sequence (e.g., a unique or configured sequence); and/or a PRACH resource reserved. The transmitter may provide the indication when it has no more data to send. The indication may be used as an end marker for a set/TOW of one or more transmissions. The indication may be provided and/or used to indicate and/or determine the last burst of a split burst transmission. A transmitter may provide the indication in or with a transmission (e.g., an UL transmission or a DL transmission) and a receiver may receive the indication.

In some circumstances a device (e.g., eNB) may allocate or schedule multiple TOWs that may be non-contiguous, for example when a transmission (e.g., to or by a WTRU) may exceed a time limit (e.g., N or a MCOT restriction). The device may for example allocate W TOWs, where the (e.g., each) TOW comprises M time resources and a transmitter may only transmit using up to N of the M time resources of the TOW. Further, a device (e.g, eNB) may indicate multiple start times, for example for aperiodic scheduling. For TOWs with different durations, the device may indicate a duration for one or more (e.g., each) TOW.

Figure 4A:
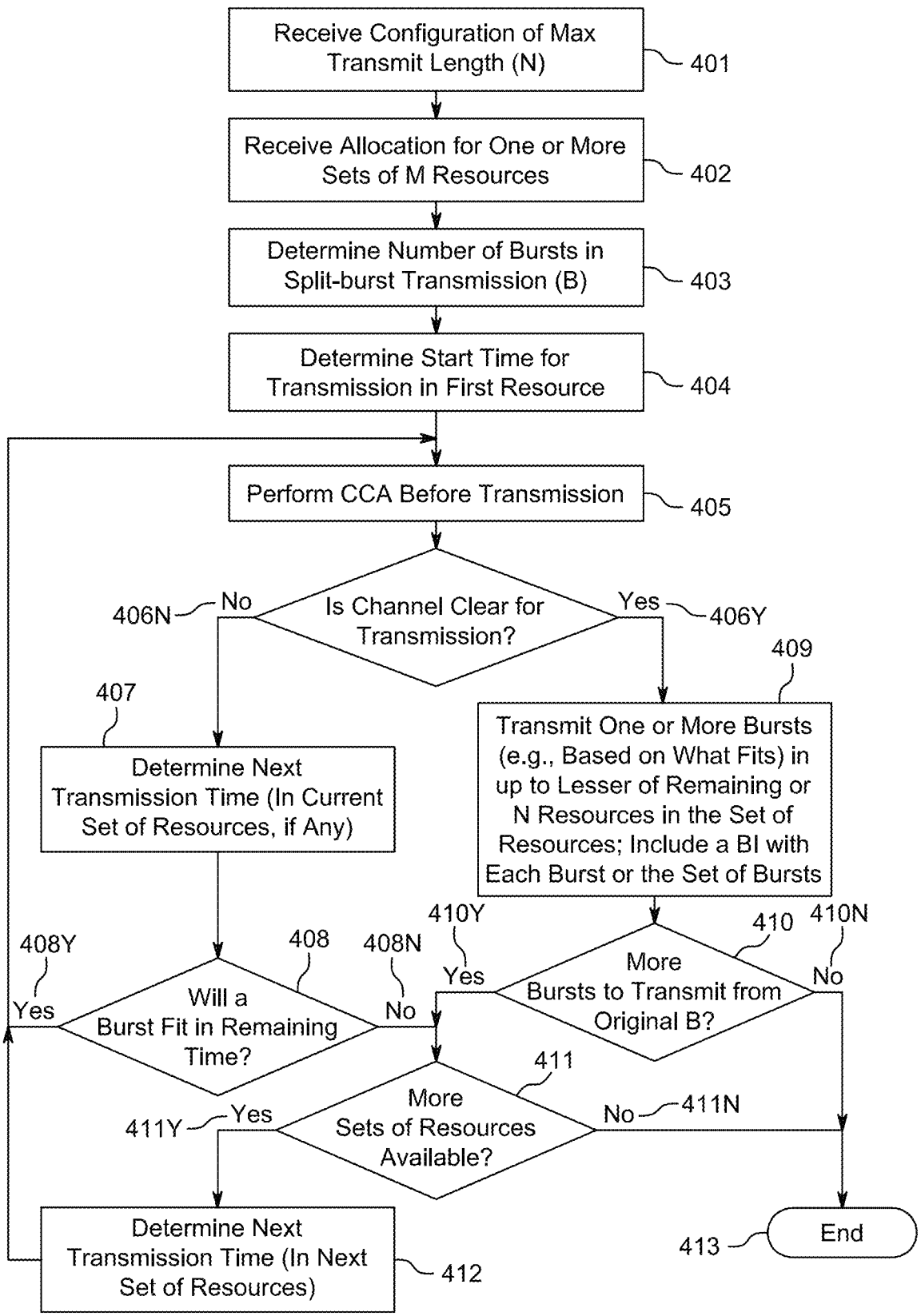
FIG. 4A is an illustration of an example process for a transmission split into burst(s) according to one or more embodiments disclosed herein.

FIG. 4A illustrates an example process of a transmission split into a burst(s). As discussed herein, the total message (e.g., data or control) that a transmitter may wish to transmit may be referred to as a transmission. In some circumstances, the total transmission may not fit into a set (e.g., TOW) of allocation of resources (e.g., the transmission may use or may need to use more than N resources or more than the MCOT), and may need to be broken up into one or more bursts. The bursts may be organized into sets of one or more bursts where the burst size and/or number of bursts transmitted for a given TOW will only be transmitted in N or fewer resources. In one example, the transmission may be a NB (e.g. NB-IoT), bandwidth limited (BL) or CE transmission.

At 401, a transmitter (e.g., an eNB or a WTRU) may receive a configuration of a maximum transmit length of N resources (e.g., time resources). At 402 the transmitter may be allocated one more set of M resources for one or more transmissions, where only N of M resources may be used.

At 403, the transmission may be split (e.g., divided or segmented) into a set of B bursts (e.g., by a WTRU, eNB, or a transmitting device), when the transmission may need or may use K resources (e.g., in time) where K may be less than N, otherwise each burst may use (e.g., may be transmitted in) N resources (e.g., no more than N resources), where N may be preconfigured. The bursts in the set of bursts may be the same size or different sizes. Generally, the transmitter may determine the number/size of bursts for a transmission based on at least one of: a) the resource (e.g., the first resource) within the set of resources where the transmitter determines the channel to be free; b) the remaining time in the set of resources, for example when the transmitter determines the channel to be free; c) the number of bursts still to be transmitted which may be B or less; and/or d) N. In some instances, the transmission may be adapted such that the bursts may be the same size (e.g., padding or rate-matching may be used). For example, the transmitter may transmit up to the number of bursts that may fit in the time left or remaining (e.g., when the channel is determined to be free or beginning with the transmission opportunity for which the channel is determined to be free), while not exceeding MCOT or N (e.g., the max allowed number of contiguous time resources (e.g. subframes) that may be used for transmission).

At 404 the transmitter may perform a CCA (e.g., full CCA) and determine the start time for the transmission in a first resource of a TOW. At 405, the transmitter may determine channel availability using CCA (e.g., short CCA) immediately before the transmission of a subset of the B bursts, (e.g., Bsub bursts), in up to N of the M resources.

As discussed herein, the allocation of the one or more sets of M resources that may be used for the transmission may comprise a finite number of TOWs (e.g., W) or may be allocated until cancelled or deactivated. In some cases, the allocation may be for a specific transmission, and the value of M may be the same or different for different TOWs. Also, the value of N may be the same or different for different TOWs. For example, the value of N may change (e.g., may be configured or reconfigured) depending on the set of resources or for different TOWs.

At 405, if the channel is clear at 406Y based on a CCA (e.g., short CCA), then at 409 the transmitter may transmit one or more bursts (e.g., based on what fits) in the lesser of the remaining resources or the N resources in the set of allocated resources M of the TOW. For each burst or set of bursts a BI may be included. At 410N, if there are no more bursts to transmit from the original bursts B, then the transmission process may be over 413. At 410Y, if there are more bursts to transmit from the original bursts B, then the transmitter determines if there are more TOWs available at 411. If there are more TOWs available 411Y, then the next transmission time is determined 412, and the process cycles back to CCA check before transmission 405. If there are not more TOWs available 411N, then the transmission process may be over 413.

At 406N, if the channel is not clear for transmission, then the next transmission time must be determined 407. The transmitter may then determine if the burst will fit in the remaining time 408 of the given TOW (i.e. set of available resources). If the burst does not fit 408N, then the transmitter determines whether more TOWs are available 411, as discussed herein. If the burst does fit in the remaining time 408Y, then the process cycles back to perform a CCA check before transmission 405.

Figure 4B:
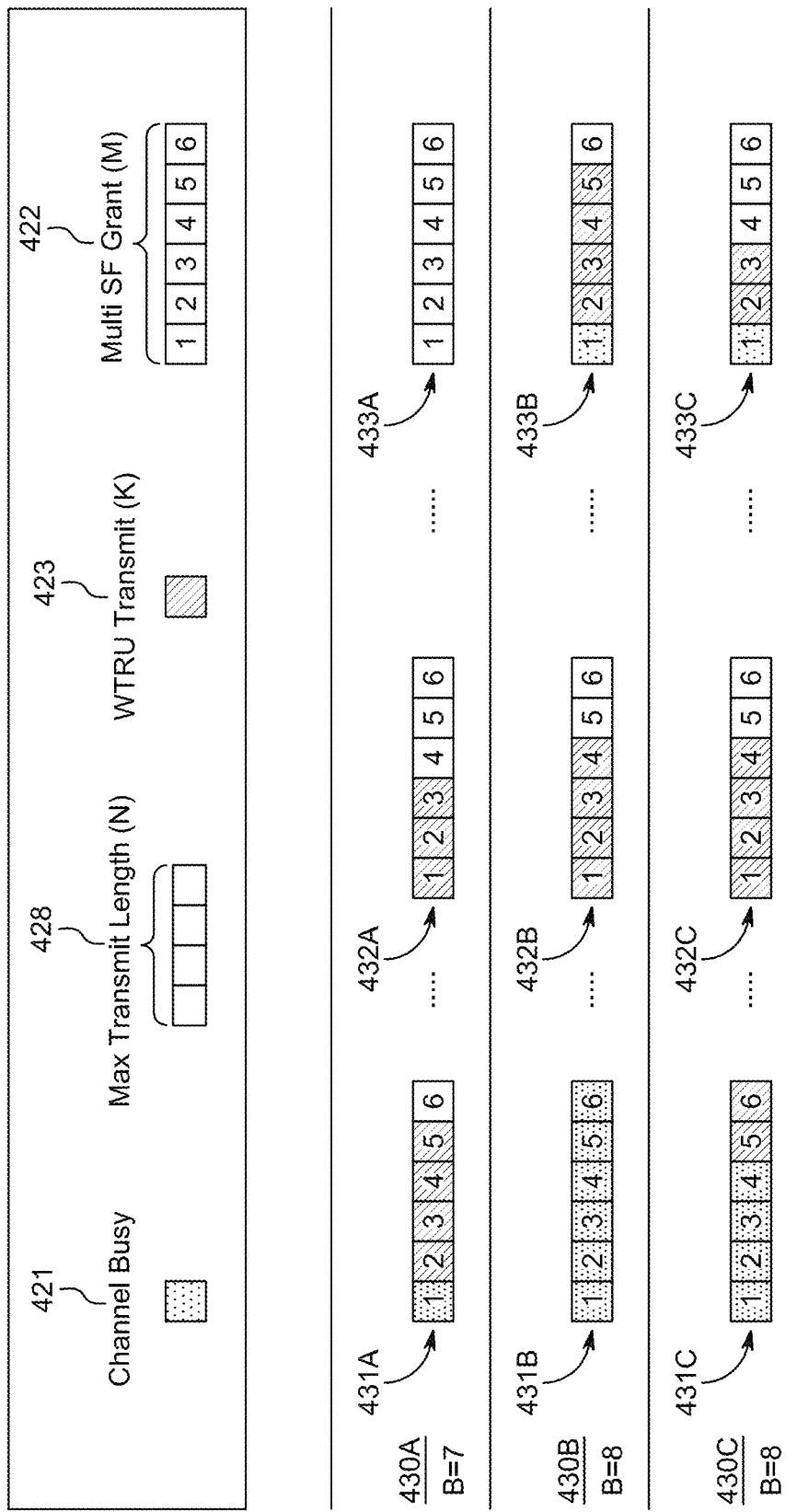
FIG. 4B is diagram of example transmissions using split bursts.

FIG. 4B illustrates additional examples and the example process of FIG. 4A concerning a transmission using a split burst. In the example as shown in FIG. 4B, the resources may be subframes, the grant M resources 422 may be equal to six subframes, all sets of granted resources (i.e., TOWs) may be the same, the maximum transmit length N 428 may be equal to four subframes, a burst may use one subframe, and a transmission opportunity may begin on a subframe boundary.

In the example of 430A, a transmitter may attempt to transmit a transmission, where the number of bursts (B) may be seven and the transmitter may only transmit four bursts (N=4) at most at a given time. The transmitter may determine that the channel is available after subframe 1 (e.g. at the subframe boundary) of TOW 431A. The transmitter may transmit N, four bursts, in the TOW 431A, since the transmitter must transmit seven bursts total and four is the most that can be transmitted in a given TOW or transmission opportunity N 428. Consequently, the transmitter may not use the last subframe of TOW 431A. The transmitter may transmit the remaining bursts (e.g., the remaining three bursts) in the next TOW of the allocation, TOW 432A, if and/or when the channel is available. In the second TOW 432A, there are no busy subframes so the channel is available to transmit in the first available opportunity and the transmitter may then transmit the remaining three bursts of the seven total bursts. In a later TOW 433A, there is no need for any further transmissions since the transmission of all of the bursts is complete.

In the example 430B, there may be eight bursts. In a first TOW 431B, the transmitter may determine that the channel is busy for the entire TOW 431B. In the second TOW 432B, the transmitter may find the channel is available in the first transmission opportunity (i.e., subframe 1 of TOW 432B). The transmitter may transmit bursts for the maximum allowed length N 428 (e.g., four subframes). The transmitter may transmit the remaining bursts in the next available TOW (or a later TOW), if and/or when the channel is available. In some later TOW 433B (i.e., the next TOW or some later TOW), the channel may be available at the second transmission opportunity (i.e., subframe 2) and the transmitter may transmit the remaining four bursts of the total eight bursts that needed to be transmitted.

In the example of 430C, there may be eight bursts. In the first TOW 431C, the transmitter may determine that the channel is busy until the fifth transmission opportunity (i.e., subframe 5) and may transmit as many bursts that can fit in the remaining grant M 422 of TOW 431C, which in this example is two bursts. In the second TOW 432C the transmitter may determine that the channel is free right away and may transmit in the first transmission opportunity (i.e., subframe 1 of TOW 432C) the maximum transmit length N 428, which in this example is four bursts. The transmitter may transmit the remaining bursts in the next available TOW (or a later TOW), if and/or when the channel is available. In some later set 433C (i.e., the next set or some later set), the channel may be available at the second transmission opportunity (i.e., subframe 2) and the transmitter may transmit the remaining two bursts of the total eight bursts that needed to be transmitted.

In one example, the transmitter may be a WTRU with parameters configured by a base station and the WTRU may perform CCA before the start of a TOW and/or may determine if a channel is or will be available for transmission at the start of the TOW. If the channel is determined to be available, the WTRU may transmit in up to N resources (e.g., beginning with the start of the TOW). If the channel is determined to be unavailable at the start of the TOW, the WTRU may perform (i.e., continue to perform) CCA for transmission at a later time. When the WTRU determines the channel to be idle within the TOW and there are enough resources remaining to support the WTRU's transmission, the WTRU may transmit its transmission.

Figure 5:
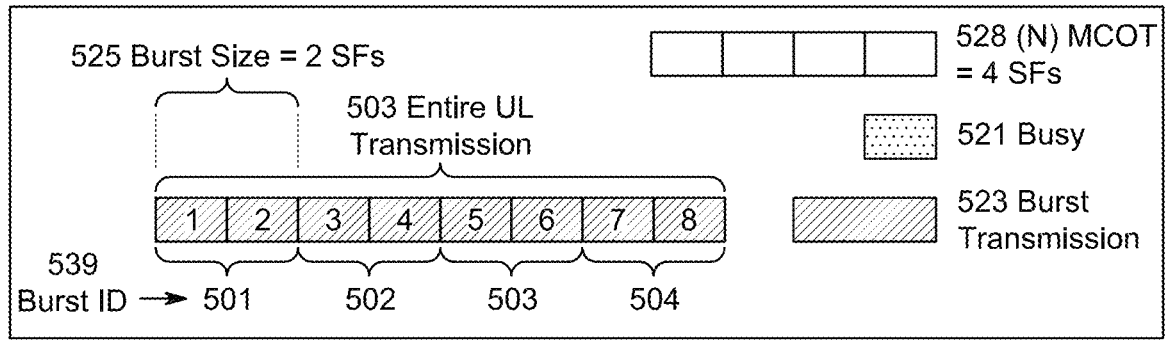
FIG. 5 is a diagram of example transmissions using burst indicators.
Figure 5:
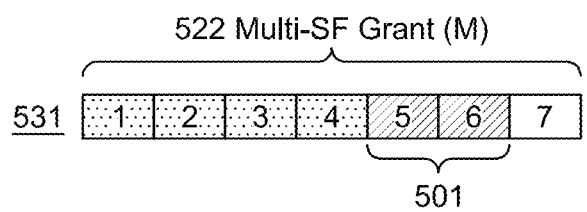
Figure 5:
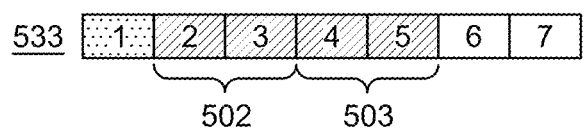
Figure 5:
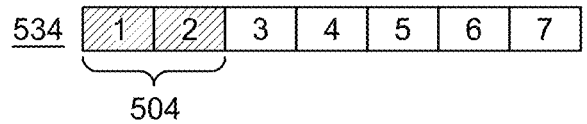

FIG. 5 illustrates an example transmission process using a burst indicator (BI). A burst indicator and a burst ID may be used interchangeably, and may be unique to each burst (e.g., a burst counter). In one example, a different BI may be transmitted in or with a first burst and a second burst of a split-burst transmission. The BI that may be transmitted in or with a burst may indicate which burst (e.g., which burst number) of a split burst transmission or of a set bursts the burst may be.

A BI may be, may include, or comprise one or more (e.g., a set) of a pattern, a signature, a signal (e.g. a reference signal (RS)), or a sequence. The term signal and/or sequence may be used to represent a signature, a signal, and/or a sequence. A signal may be a reference signal (RS) such as a cell-specific RS (CRS), a demodulation RS (DMRS), a channel state information RS (CSI-RS) among others. A sequence may be a Zadoff-Chu sequence. A BI and/or a signal/sequence (or a set or pattern of signals/sequences) that may be used for a BI may be unique and/or may be or configured for a WTRU, a purpose, a channel or set of channels, a burst, a set of bursts, a transmission, a split-burst transmission, among others. Configuration may be via higher layer signaling (e.g., RRC signaling) and/or physical layer signaling.

For example a BI that may be transmitted in or with an UL burst transmission, and may be indicated or identified in a DCI. The DCI may be or may include an UL grant or allocation, for example for the full transmission that may be a split-burst transmission. The WTRU may transmit the indicated (e.g., identified) BI in at least one of the burst transmissions of the full or split-burst transmission.

Alternatively, a BI may be transmitted in or with an DL burst transmission, may be indicated or identified in a DCI. The DCI may be or may include a DL grant or allocation, for example for the full transmission that may be a split-burst transmission. The WTRU may combine one or more bursts that the WTRU may receive that may include or be associated with a transmission of the indicated (e.g., identified) BI.

The one or more signals/sequences or a pattern of one or more signals/sequences of a BI may be at least one of the following: WTRU-specific (e.g., configured for a WTRU); burst or split-burst specific (e.g., configured for and/or associated with a burst or a split-burst transmission); cell-specific (e.g., configured for a cell); group-specific; channel specific (e.g., specific to one or more channels such as one or more common channels); channel-type specific; and/or HARQ process or HARQ process ID specific (e.g., configured for and/or associated with a HARQ process or HARQ process ID).

In one example, a WTRU may transmit a BI configured for a HARQ process (e.g., HARQ process ID) when the WTRU may transmit a burst for the HARQ process. A WTRU may combine one or more bursts that may be associated with a HARQ process based on reception of a BI in or with the one or more burst that may indicate the bursts are associated with the HARQ process.

The example shown in FIG. 5 may be similar to the process explained regarding FIGS. 4A and 4B, except the transmission parameters may be different and the burst indicator/burst identity may be demonstrated. An associated control signaling may be transmitted for each burst and the associated control signaling may include a BI. Initially, a transmitter (e.g., WTRU) may be configured with (e.g., may receive a configuration for) one or more parameters associated with the division/splitting of at least one transmission or type of transmission into bursts. For a given transmission, the transmitter (e.g., WTRU) may receive and process configuration information ahead of time (e.g., determining number of bursts for a given transmission). A transmitter may receive the configuration, which may include at least one parameter, via upper layer signaling (e.g. RRC signaling) and/or or physical layer signaling (e.g., via a control channel and/or a DCI).

The configuration (e.g., the one or more parameters) may include at least one of the following: maximum transmission length/time resources within a set (N); codeblock size (e.g., when a burst may be based on codeblocks); burst size (e.g., in time, number of resources, number of codeblocks, or number of repetitions); minimum burst size and/or maximum burst size; number of bursts (B); whether to insert per burst CRC; scheduling parameters (e.g., MCS, frequency resources, transmission power, etc.) of a burst, a set of bursts, or a subset of bursts; number of time resources (i.e., time units) a burst may be mapped to (e.g. number of slots, mini-slots, OFDM/DFT-s-OFDM symbols, subframe and the like); one or more parameters that may identify and/or configure a signature, signal, scrambling code, sequence and/or pattern that may be included in or with a burst transmission; and/or one or more parameters that may identify and/or configure a burst indicator (BI) that may be included in or with a burst transmission.

For the one or more parameters that may identify and/or configure a signature, signal, scrambling code, sequence and/or pattern that may be included in or with a burst transmission, each burst in the set of bursts may have a burst identity (e.g., burst ID) and the burst ID may be used to scramble the bits in each burst. For example, the coded bits of a burst may be scrambled with its associated burst ID (e.g., the burst ID may be used to initiate the scrambling code of the burst).

Referring to the example of FIG. 5, a transmitter may transmit a transmission 530 using a set of resources, such as a multi-subframe grant M 522. The transmission 530 may be broken up in to bursts based on a received configuration, such as a burst size of two subframes 525. The maximum transmit length N 528 may be set to the MCOT and may be equal to four subframes. In this example, the entire uplink transmission 530 may comprise eight subframes and be broken up into four bursts. Each burst may have a burst ID 539, such as 501, 502, 503, and 504, where each burst contains two subframes.

For the first TOW 531, a start time may be determined by performing a CCA (e.g., full CCA) where the transmitter determines that the channel is not busy after subframe 4, at which point the transmitter determines how many of the bursts may fit in the remaining grant of resources 522 when the channel (e.g., frequency channel) is determined to be usable or available (e.g., when CCA is determined to pass). For example, in the first TOW 531 the first burst with burst ID 501 may be transmitted in subframes 5 and 6, and subframe 7 may not have a burst. The process may continue until the entire UL transmission 530 is sent.

In the second TOW 532, the channel may be busy through subframe 6, meaning that there would be not enough subframes left in the grant M 522 to send any bursts. The process would continue to the third TOW 533 where after subframe 1 the channel may be free and even though three bursts may fit in the remaining grant M 522, only the next two bursts, 502 and 503, may be transmitted since there is an MCOT 528 of four subframes (i.e., two bursts). In the next TOW 534, the channel may be free immediately and the last burst, burst ID 504, may be sent leaving no more bursts to send in the remaining SFs since the entire UL transmission 530 has been sent.

In the example of FIG. 5, the burst ID may be used to scramble the bits in each burst. Additionally, for the one or more parameters that may identify and/or configure a signature, signal, scrambling code, sequence and/or pattern that may be included in or with a burst transmission, a DM-RS sequence/pattern for a burst may be determined based on its associated burst ID. For example, a burst may be transmitted with an associated DM-RS and the associated DM-RS sequence/pattern may be determined based on the burst ID. In such a case, at least one of following may apply: one or more cyclic shifts of a base sequence (e.g., Zadoff-Chu sequence, Golay sequence, m-sequence) may be used as DM-RS sequences and a cyclic shift for a DM-RS may be determined based on the burst ID; and/or one or more DM-RS patterns may be used based on the interleaved frequency domain multiplexing (IFDM), and a DM-RS pattern may be determined based on a frequency offset where a frequency offset (e.g., a DM-RS pattern) for a DM-RS may be determined based on the burst ID.

For one or more parameters that identify and/or configure a burst indicator (BI) included in or with a burst transmission, a CRC may be used or attached for each burst, and, a burst indicator (BI) may be transmitted implicitly with a CRC scrambling. For example, the CRC may be scrambled with an associated BI at a transmitter, and a receiver may descramble the CRC with the associated BI for CRC check.

Also for one or more parameters that may identify and/or configure a burst indicator (BI) that may be included in or with a burst transmission, a subset of resource elements (REs) in a burst may be reserved (e.g., REs next to the DM-RS) and the BI may be transmitted in the subset of REs.

In some cases, one or more bursts of a split burst transmission may be the same. For example, a first burst of a transmission that may be split into B bursts may be a replica of a second burst of the transmission. Further, when bursts may be used for carrying repetitions (e.g., CE repetitions) of a signal or channel, one or more (e.g., all) bursts of a split burst transmission may be the same (e.g., may comprise, include, or carry the same bits which may be coded bits). One or more bursts may be the same inclusive or exclusive of a BI that may be include in or with the burst transmission. The repetition of a transmission may include a repetitive transmission of the same information bits while the redundancy version of the coded bit may be different in each repetition. For example, a same information bits may be channel coded and a different part of coded bits may be transmitted based on repetition number.

In another example a first burst of a split burst transmission may carry a subset of the bits or symbols of the transmission and a second burst of the split burst transmission may carry a different subset of the bits or symbols of the transmission. For example, a transport block (e.g., that may use multiple resources for transmission) may be partitioned into B bursts, where each burst may carry a subset (e.g., a different subset) of the bits or symbols of the transport block. Further, the partitioning may be at the codeblock level; a burst may comprise, include, or carry one or mode codeblocks of a transmission (e.g., of a transport block).

Figure 6:
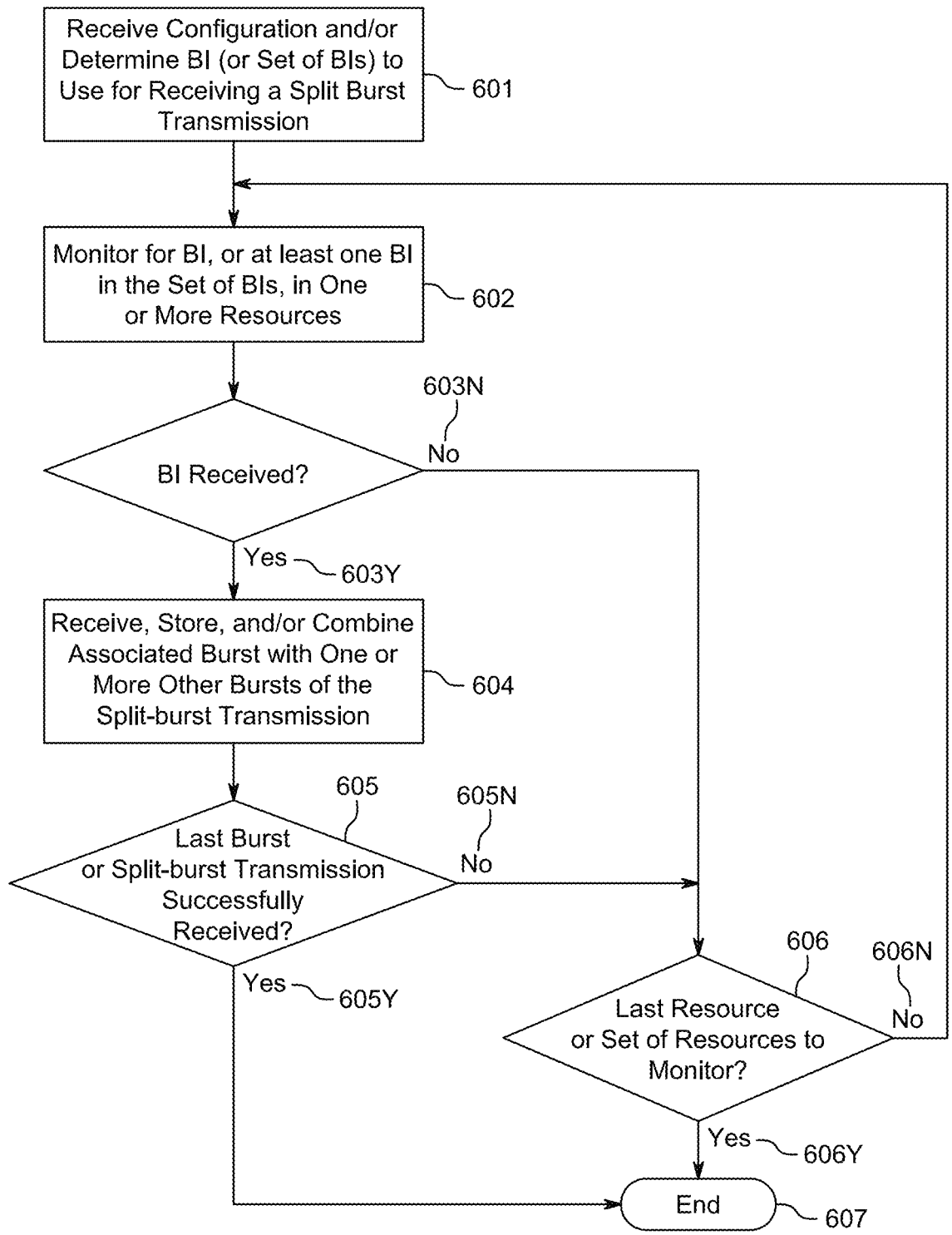
FIG. 6 is an illustration of an example transmission process using burst indicators.

FIG. 6 illustrates an example of a process for receiving a transmission using a bit indicator. At 601 a receiver may receive a configuration for BI and/or determine a BI, or set of BIs, to use for receiving a split burst transmission. At 602 the receiver may monitor for a BI, or at least one BI in a set of BIs, in one or more resources (e.g., subframes). The receiver may attempt to receive one or more bursts of a split burst transmission. If a BI is not received 603N and this is the last resource or set of resources/TOW to monitor 606Y, then the process may be over 607. If a BI is not received 603N and it is not the last resource or set of resources/TOW to monitor 606N, the process may go back to monitoring 602.

If a BI is received 603Y, then the receiver will receive, store, and/or combine 604 the associated burst with one or more other bursts of the split burst transmission. When a burst carries a subset (e.g., of the bits) of a full transmission, the receiver may combine (e.g., assemble or concatenate) the bursts to obtain, receive and/or decode (e.g., successfully receive and/or decode) the full transmission. When a burst carries a repetition (e.g., of the bits) of a transmission, the receiver may combine (e.g., soft combine) the bursts to receive and/or decode (e.g., successfully receive and/o decode) the transmission. A BI may be provided (e.g., transmitted) and/or used (e.g., by a transmitter), for example to enable a receiver to combine the bursts of a split burst transmission. A receiver may use at least one BI to determine when and/or how to combine one or more bursts of a split burst transmission.

If the last burst or split-burst transmission was successfully received 605Y, then the process may be over 607. If the last burst or split-burst transmission was not successfully received 605N, then the receiver determines whether this is the last resource or set of resources/TOW to monitor.

Generally, a receiver may monitor a resource (e.g., each resource) such as a subframe or slot for a BI. For example a WTRU may monitor each resource that may be at least one of: a DL resource; a resource configured for burst transmission and/or reception; and/or a resource configured for the transmission and/or reception of a specific burst transmission or a type of burst transmission (e.g., a common or WTRU-specific transmission). When the receiver receives a BI, the receiver may receive an associated burst and/or combine an associated burst with a previously received burst that may have been associated with the same BI.

The BI may be received in several possible ways, for example: the BI may be included with (e.g., as part of) a burst transmission (e.g., each burst transmission); the BI may precede (e.g., may be transmitted and/or received before) a burst transmission or a set of burst transmissions; the BI may follow (e.g., may be transmitted and/or received after) a burst transmission or a set of burst transmission; the BI may be transmitted and/or received during a burst transmission; and/or the BI (e.g., a BI transmission) may be (e.g., at least partially) interleaved and/or overlapped with a burst transmission in time and/or frequency.

In some cases, a receiver may successfully receive a BI in or based on a single transmission of the BI without repetition (e.g., in multiple bursts). The BI may enable a receiver to determine or detect the presence of a burst, for example to combine with one or more previously received bursts. A receiver may determine a burst to be present (e.g., in a resource) based on reception of a BI (e.g., in or with the resource). The receiver may use a BI to combine (e.g., assemble or soft-combine) a received burst with a previously received burst, (e.g., based on a received BI). For example, when a transmission (e.g., of a channel or transport block) may be repeated across multiple bursts.

Repeated bursts and/or BIs may be used and/or provided (e.g., when CE is used). A BI may be used by a receiver to determine that a transmission may be a burst of a split burst transmission and/or a repetition of a transmission. The receiver may combine or determine to combine a first burst or transmission with a second burst or transmission based on the reception of a BI with the first and/or second bursts and/or transmissions. Also, a receiver may combine a set of repetitions of a BI that may be received in or with a set of bursts transmitted together or contiguously to receive (e.g., successfully) the BI.

A BI (e.g., the same BI) may be transmitted in one or more of the bursts of a split burst transmission, for example in all of the repetitions of a burst or transmission that may be combined soft-combined to successfully receive the burst or transmission. A BI may be transmitted in or with a set of bursts, for example a BI may be repeated in or with each of a set of bursts that may be transmitted together or contiguously in time.

In an example, a BI may be transmitted and/or received in a set of time/frequency resources (e.g., of a transmission or a burst transmission). The time/frequency resources may be resource elements (REs). A RE may comprise a set of subcarriers in a frequency or at least one symbol (e.g., in time). The time/frequency resources that may be used for a BI transmission may be different than the resources used for a burst transmission. For example the burst transmission may be rate-matched around the time/frequency resources (e.g., the REs) that may be used for a BI transmission. Also, any increment of time resources as discussed herein may contain a BI. Further, a BI may be or may be included in a control channel and/or in control information (e.g., DL or UL control information) that may be transmitted with a burst.

The density (e.g., in time/frequency resources such as REs) of a BI signal/sequence or pattern of one or more signals/sequences may be a function of a CE level that may be needed or used. The pattern may be repeated in a time unit or time resource (e.g, a subframe or slot) to achieve a gain (e.g., a desired gain). The density may be higher for a higher CE level (e.g., for more CE). Pattern repetition may be increased or higher for a higher CE level (e.g., for more CE).

In some cases, non-repeated bursts and/or BIs may be provided and/or used. Non-repeated bursts and/or BIs may, for example, be used for a NB transmission such as a NB-IoT transmission that may use multiple resources to transmit a transmission (e.g., a channel or transmission block). Non-repeated bursts and/or BIs may, for example, be used when CE may not be used.

In some cases, a BI may be related to or a function of a WTRU-ID or C-RNTI. A WTRU may (e.g., only) use or combine one or more bursts that may be intended for it. A WTRU may determine that a burst may be intended for it based on the BI that may be associated with and/or transmitted in or with the burst. Also, a WTRU may transmit a BI in or with a burst based on its WTRU-ID or C-RNTI. An eNB may determine that a burst may be from a WTRU (e.g., a specific WTRU) based on the BI that may be transmitted in or with the burst.

In some cases, a BI may be associated with or configured for a common channel. For example, a WTRU may determine that a burst may be associated with or configured for a common channel based on the BI that may be associated with the burst, transmitted in or with the burst, and/or received by the WTRU in or with the burst. The WTRU may or may only use or combine one or more bursts that the WTRU may determine to be associated with or configured for a common channel, for example to receive and/or decode (e.g., successfully receive and/or decode) the common channel.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method implemented by a wireless transmit/receive unit (WTRU), the method comprising:
    receiving downlink control information (DCI), wherein the DCI is associated with a set of resource allocations, and wherein the DCI indicates a number of time resources for each resource allocation of the set of resource allocations, a start time for the set of resource allocations, and a total number of resource allocations in the set of resource allocations;
    determining that at least one time resource for at least one resource allocation of the set of resource allocations is unavailable for transmission; and
    transmitting data via the set of resource allocations, wherein a subset of the number of time resources indicated via the DCI is used for transmission for the at least one resource allocation of the set of resource allocations.

2. The method of claim 1, wherein the set of resource allocation is consecutive in time.

3. The method of claim 1, wherein the number of time resources for each resource allocation comprises a number of symbols allocated for each resource allocation.

4. The method of claim 3, wherein the subset of the number of time resources indicated via the DCI used for transmission for the at least one resource allocation of the set of resource allocations comprises a subset of symbols of the number of number of symbols allocated the at least one resource allocation.

5. The method of claim 3, wherein the number of symbols corresponds to a number of orthogonal frequency division multiplexing (OFDM) symbols or a number of discrete Fourier transform spread OFDM (DFT-s-OFDM) symbols, and wherein the number of symbols allocated for each resource allocation are consecutive in time.

6. The method of claim 1, wherein the data corresponds to a transport block, and wherein each resource allocation of the set of resource allocations is used for transmitting a transmission burst.

7. The method of claim 1, wherein each resource allocation of the set of resource allocations is used for sending a respective repetition of a set of repetitions.

8. The method of claim 7, wherein each repetition corresponds to a respective redundancy version of the data.

9. The method of claim 1, wherein the set of resource allocations corresponds to a transmission opportunity window (TOW).

10. The method of claim 1, wherein the subset of the number of time resources does not comprise the at least one time resource that is unavailable for transmission.

11. A wireless transmit/receive unit (WTRU) comprising:
a processor and a transmitter, wherein the processor and the transmitter are configured to:
receive downlink control information (DCI), wherein the DCI is associated with a set of resource allocations, and wherein the DCI indicates a number of time resources for each resource allocation of the set of resource allocations, a start time for the set of resource allocations, and a total number of resource allocations in the set of resource allocations;
determine that at least one time resource for at least one resource allocation of the set of resource allocations is unavailable for transmission; and
transmit data via the set of resource allocations, wherein a subset of the number of time resources indicated via the DCI is used for transmission for the at least one resource allocation of the set of resource allocations.

12. The WTRU of claim 11, wherein the set of resource allocation is consecutive in time.

13. The WTRU of claim 11, wherein the number of time resources for each resource allocation comprises a number of symbols allocated for each resource allocation.

14. The WTRU of claim 13, wherein the subset of the number of time resources indicated via the DCI used for transmission for the at least one resource allocation of the set of resource allocations comprises a subset of symbols of the number of number of symbols allocated the at least one resource allocation.

15. The WTRU of claim 13, wherein the number of symbols corresponds to a number of orthogonal frequency division multiplexing (OFDM) symbols or a number of discrete Fourier transform spread OFDM (DFT-s-OFDM) symbols, and wherein the number of symbols allocated for each resource allocation are consecutive in time.

16. The WTRU of claim 11, wherein the data corresponds to a transport block, and wherein each resource allocation of the set of resource allocations is used for transmitting a transmission burst.

17. The WTRU of claim 11, wherein each resource allocation of the set of resource allocations is used for sending a respective repetition of a set of repetitions.

18. The WTRU of claim 17, wherein each repetition corresponds to a respective redundancy version of the data.

19. The WTRU of claim 11, wherein the set of resource allocations corresponds to a transmission opportunity window (TOW).

20. The WTRU of claim 11, wherein the subset of the number of time resources does not comprise the at least one time resource that is unavailable for transmission.

* * * * *